INFORMATION RETRIEVAL SYSTEM

Filed Jan. 15, 1965 6 Sheets-Sheet 1

INVENTOR,
Vance R. Wanner

BY Frank A. Lukasik AGENT
R. J. Tompkins
ATTORNEY

INVENTOR,
Vance R. Wanner

BY Frank A. Lukasik AGENT

R. J. Tompkins
ATTORNEY

INVENTOR
Vance R. Wanner
BY Frank A. Lukasik AGENT
R. J. Tomphins
ATTORNEY

March 19, 1968 V. R. WANNER 3,374,486

INFORMATION RETRIEVAL SYSTEM

Filed Jan. 15, 1965 6 Sheets-Sheet 4

INVENTOR
Vance R. Wanner
BY Frank A. Lukasik
AGENT
R. J. Tompkins
ATTORNEY

INVENTOR,
Vance R. Wanner
BY Frank A. Lukasik AGENT
R. I. Tompkins
ATTORNEY

INVENTOR,
Vance R. Wanner

BY Frank Q. Lukasik AGENT

R. J. Tompkins ATTORNEY

United States Patent Office 3,374,486

Patented Mar. 19, 1968

3,374,486
INFORMATION RETRIEVAL SYSTEM

Vance R. Wanner, 1921 Tenley Drive, Collingwood, Alexandria, Va. 22308

Filed Jan. 15, 1965, Ser. No. 425,975
2 Claims. (Cl. 340—172.5)

ABSTRACT OF THE DISCLOSURE

An information retrieval system wherein data is stored by both broad category and desired retrieval time. Stored data is continually read out and simultaneously made available to many users. Users identify and receive desired data by category and characteristic, combination of characteristics or permutations of characteristics.

The invention described herein may be manufactured and used by or for the Government of the United States of America for governmental purposes without the payment of any royalties thereon or therefor.

The present invention relates to a storage retrieval system and more particularly to an electronic system for interrogating a library or information storage system The development of high speed data-processing systems has made possible the application of electronic techniques to the problem of storage and selection of information. Mankind in general and industry in particular have been and presently are accumulating knowledge at a prodigious rate and with each passing day the storage and retrieval of this knowledge becomes more complex. An installation which stores large masses of information for future access may be descriptively termed a library. For large information storing capacity such an installation may employ a large number of storage stations.

A problem in data retrieval of extreme interest is the searching of library, research or patent files to determine the identity of available material relating to chosen subject matter. Solutions have ranged from the slow and tedious printed index systems of a library to the modern-day systems employing punched cards, magnetic tape or microfilm records. Greater processing speeds, and much larger information-handling capacity, may be obtained if the recording medium employed is magnetic tape and if modern electronic techniques are utilized for representing and manipulating information.

General purpose computers may be arranged to search magnetic tape index files; however, the organization of a general purpose computer is such that speed of search would generally be computer limited. That is, in such machines, blocks of indexing information from a magnetic tape index file are placed in machine storage for processing and the file index tape must be stopped from time to time to allow the machine to complete its search of the stored information block. Easy access to the stored information and ready and rapid selection of particular stored information are highly desirable.

The library may catalog, for example, stock quotations, ticket reservation and inventory control systems. Most of these systems operate in predetermined cycles, deriving information from and supplying information to a synchronous storage medium, such as for example, a magnetic drum. The use of a synchronous storage medium, however, imposes severe limitations on the capacity of the system for storing information, as well as on the form in which the information can be stored. In the framework of conventional digital systems using magnetic tapes, drums, discs, etc., and which function in sequential, word bit by word bit manner, this type of search becomes almost impractical by reason of its time duration.

The general purpose of this invention is to provide a storage retrieval system which permits access to information based primarily upon criteria defined at the time of search rather than that defined at the time of storage. The stored information undergoes only the most general ordering at the time of storage. This ordering consists only of placing the information in the same file with other information of the same broad category. Within a broad category, the information is essentially not ordered at all. The stored information is not constrained to conform to a limited number of retrieval keys. While the stored information, either in literal or list form may be "sharpened" by additional descriptors or other embellishments such as precis or abstracts, these only serve to increase the access to the information since the stored information provides its own index.

It is an object of the present invention to accurately and rapidly retrieve stored information.

Another object of this invention is to increase the efficiency of data retrieval systems.

It is a further object of this invention to make more efficient use of the storage medium in a data retrieval system.

Another object of this invention is to provide an improved system for providing access to stored information, which system has a capacity greatly in excess of the systems of the prior art.

A further object of the invention is to conserve storage space by having the stored data serving as its own index thereby reducing the time required to traverse the data store.

Another object of the invention is to introduce parallelism into data bit storage and handling by providing sufficient parallel channels in order to allow each binary bit of a word to be stored and operated upon simultaneously with every other bit of the same word.

A still further object of the invention is to introduce parallelism into search operations by having each pass of the stored data independent of the question being asked, thus allowing many viewers, in quest of different data, to witness the data search simultaneously.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Since the circuit components in themselves form no part of the present invention, they are represented by block diagrams. Examples of specific circuitry for the components can be found in well known computer text books such as Large Capacity Memory Techniques for Computing Systems by M. C. Yovits and technical reports entitled Theoretical Aspects of the Mechanization of Literature Searching by Bar-Hillel and The Logical Design of a Multichannel Device for the Retrieval of Information by the instant inventor for the Office of Naval Research. It should be clearly understood, however, that the present invention may be fabricated using any of the known technologies such as vacuum tubes, transistors, cryoelectric circuitry, etc.

Figure 2:
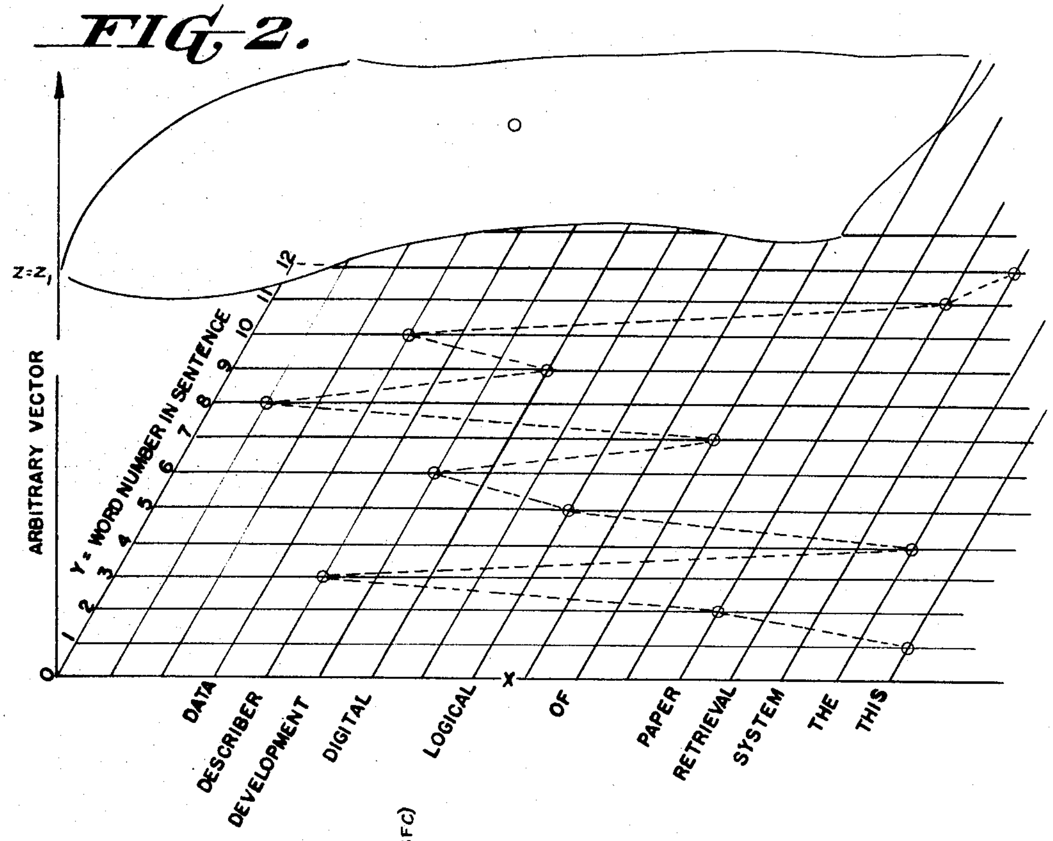
FIG. 2 illustrates a graphical sentence display.

Referring now to the drawings, wherein like reference characters designate like or corresponding parts throughout the several views, there is shown in FIG. 2 an alphanumerical information display in a three-dimensional XYZ coordinate system which is defined orthogonal only in the plane $X=0$. A large finite number of integral points along the X axis, $x_1, x_2, x_3, \ldots, x_n, \ldots X_n$, are selected, and to each of these $x_n$ is assigned a particular word of the dictionary, proper name, or digital number. The $y$ axis is also divided into the points $y_1, y_2, y_3, \ldots, y_m, \ldots, y_M$, where any $y_m$ corresponds to "word number" counting from the beginning of a body of information. At $z=0$, arbitrarily the plane of naturally occurring information, a given body of information assumes a particularly zig-zag pattern of points as defined by its word content and word ordering. Now suppose further that as $z$, an unspecified vector quantity, takes on values other than zero, the $xy$ coordinates undergo transformation and the information pattern becomes thus distorted. At certain $z=Z_1, Z_2, \ldots, Z_p, \ldots, Z_p$, the information maps into discrete points. These points may also be the intersections of other words or descriptors not necessarily occurring in the original body of information. Indeed, they may even be defined in terms of but a single vector quantity or tag number.

In some subjective manner, human beings quite easily make the transition along the $z$ axis, thus compressing information to point loci defined by certain descriptors. This, therefore, is the foundation for current information storage and retrieval systems. Typically, a relatively small number of coordinates are defined, and stored information is shrunken on to their intersection. There is a certain a prioriness in the procedure since the preselection of the lattice work upon which the stored information is strung attempts to forecast the queries which will eventually be put to the system. It is also obvious that the true point locus of a body of information must usually be displaced in storing so that it conforms to the point intersections defined by the retrieval keys. Perhaps more significant, multiple point loci for a body of information are sometimes lost completely, either through lack of coordinate definition or by failure to link these point loci with existing intersections.

The above difficulties have generally plagued the history of information storage and retrieval. Expensive systems have often been barely completed when it is found that user environment has undergone distinct changes due to shifting needs and emphases. New intersections then have to be defined, and each new descriptor, in turn, proaching $(N+1)^2/N^2$ (where N equals the number of descriptors in the system), thereby increasing the system entropy. Also, old information must be re-indexed against the new coordinates, a process which is generally time-consuming and expensive. Inevitably, the system lags the problem. It is worthy of note that much contemporary work in associative memory structure tends in this direction. At this point it seems quite evident that regardless of such efforts to increase the convergence of search operations, the ultimate route to improved access requires that the constraints on the stored information itself, as expressed above, be loosened and further, that greater flexibility be provided to describe search criteria.

*System characteristics*

The foregoing outlines the need for a versatile retrieval system which permits access to information based primarily upon criteria defined at the time of search rather than that defined at the time of storage; accordingly, the invention differs in four significant aspects from prior art. These differences are outlined in the following:

(a) *Ordering.*—The stored information undergoes only the most general ordering at the time of storage. This ordering consists only of placing the information in the same file with other information of the same broad category. Within a broad category the information is essentially not ordered at all.

(b) *Key constraints.*—The stored information is not constrained to conform to a limited number of retrieval keys. While the stored information, either in literal or list form may be "shapened" by additional descriptors or other embellishments such as precis or abstracts, these only serve to increase the access to the information since the stored information provides its own index.

(c) *Seach Operation.*—Within a given broad category the search is an end-to-end operation over the stored information whereby each item in the category is examined as to its suitability in matching search criteria.

(d) *Search criteria expression.*—Search criteria are expressed as a pattern consisting of segments related to each other by AND, OR, NOT operators. Each pattern segment consists of a string of words in a set permutation, a single word, or a single word stem.

The significance of the above differences can be appreciated by again referring to FIGURE 2. Where current systems are designed to operate on the upper boundaries, $Z=Z_1, Z_2, Z_3, \ldots, Z_p, \ldots, Z_P$, alone, the system of this invention permits operation at practically all values of the vector, including $Z=0$. It is apparent that the pattern method of expressing search criteria provides almost infinite latitude in the expression of meaning nuance as well as pattern "size" or area of inclusion.

*Organization of stored information*

It is initially supported that the universe of information existent in the system as a whole may be subdivided into large chunks which will hereafter be called Data Stores. It is assumed that these Data Stores may each contain rather well-defined bodies of information; for example, (a) Data for the current year
Data for the previous five years
Data older than five years or perhaps, (b) Electronic material data
Machinery data
Ordnance data
Operations data Inasmuch as a search through a given Data Store is an end-to-end search, the selection of data boundaries for each Data Store is influenced by the time allowable for a given class of search operations, thereby the allowable time may itself be used to define the Data Store category, so that frequently-sought data is accessible in the shortest increment of time.

Assuming that $1.3 \times 10^6$ bits per minute is representative of current read-write rates for magnetic heads, it follows that the data handling rate of the system of this invention is $1.3 \times 10^6$ words per minute. Suppose then that the information in the system is divided into three Data Stores, respectively, the short $\Delta T$, the medium $\Delta T$, and the long $\Delta T$. Arbitrarily (for illustration) it is stated that short $\Delta T$ must be completely accessible in 2 minutes, medium $\Delta T$ in 10 minutes, and long $\Delta T$ in 1 hour and 20 minutes. Short $\Delta T$ therefore contains about 2,600,000 words, medium $\Delta T$ about 13,000,000 words, and long $\Delta T$ 104,000,000 words.

As a further extension, there may be more than one independent grouping within each $\Delta T$ category, the bounds for each grouping being independent of time; for example, men, women, animals, etc. Each grouping may itself be a separate Data Store. Therefore, it is possible to establish ten well-defined areas within each $\pi T$, and the system described herein would therefore be partitioned into 30 separate Data Stores totalling about 1,196,000,000 words.

*Data store arrangement*

Within each Data Store, the information is placed in individual units, hereafter called Input Data packages. The Input Data Packages consist of varying numbers of Input Data Words. Each Input Data Package bears a unique tag number in the system. The tag number of an Input Data Package may be a serial number, a data/time accession number, or any other alpha numerical designator, provided that it is unique in the Data Store. Data Packages bear a similarity to the pages of a book, except that the words appear in sequence in a single column rather than in sequence in columns of word rows. Input Data Packages may occur in any order whatsoever.

Each Input Data Word has the same number of character positions, therefore the same number of bit positions. Each character position need not be filled; the blank characters being occupied by space coding. On the other hand, Input Data Words requiring more character positions than afforded by the standard data word length may be continued in the next Input Data Word. Provision for linking the parts will be described below.

Therefore, the Data Store bears a resemblance to an endless belt which is continuously cycled. The major portion of the belt contains the items of stored information arranged in Input Data Packages of variable length. The individual words are written across the surface of the belt on lines perpendicular to the direction of travel. The minor portion of the belt, i.e., the no-data portion, corresponds to the flyback period when the reading heads are repositioned from the end of the stored data to the beginning.

*System configuration*

Figure 1:
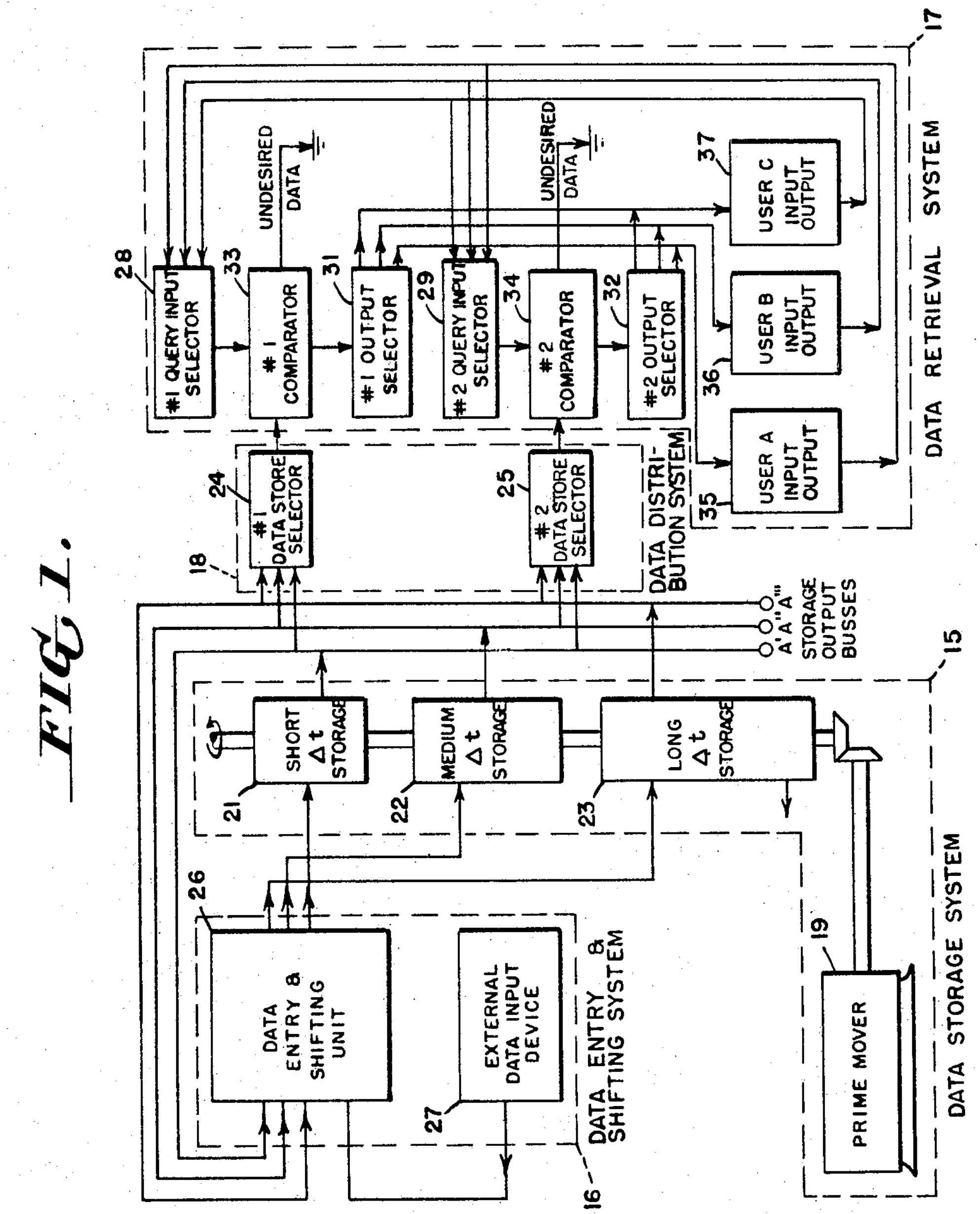
FIG. 1 shows the over-all system configuration.

From the foregoing fundamental operational and organizational concepts, the following is a general description of the instant storage retrieval system as shown in FIG. 1. Each data line in FIG. 1 consists of I parallel channels. As seen from any point, A′, A″, or A‴, for example, a complete word passes with each clock pulse. The over-all system consists of a number of subsystems: a rotating data storage system 15, a data distribution system 18, a data entry and shifting system 16, and a number of individual data retrieval systems 17. The system is operated by clock pulses from the rotating data storage system 15.

The data storage system contains a number of Data Stores 21, 22, 23, which are rotated simultaneously by a single prime mover 19. The reading and writing system for each Data Store 21, 22, 23, operates independently so that each store is read nondestructively from end to end respectively. The time required to read a given Data Store is defined as its major cycle. Therefore, each major cycle is a function of the length of the Data Store.

The data distribution system 18, contains bus channels for shifting data between the sub-systems. One set of channels is provided for each Data Store. During normal operation, the data from each Data Store appears continuously (except for flyback periods) on the associated channels.

The data entry and shifting system 16 provides for the initial input of data to any given Data Store and for the shifting of data between Data Stores.

The data retrieval systems 17 each comprise a data store selector unit 24, 25, a number of Query Input Selectors 28, 29, Comparator Units 33, 34, and a plurality of Data Output Devices 35, 36, 37. The Query Input Selectors 28, 29 and Data Output Devices 35, 36, 37 may be remotely located so that a single system may provide service to a number of remote users over a given geographical area without redundancy in storage equipment.

*General description of system*

Referring more particularly to the comparator system shown in FIG. 3, which will be described in greater detail hereinafter, the diagram has been simplified to facilitate the description of the invention. The circuit leads between the numbered blocks are intended primarily to show the routing of the data and control signals and ground leads have been deleted. The leads which signify single channel control signals have solid arrowhead direction indicating markers. The leads which signify multi channel query and data word signals have open arrow direction indicating markers.

The operation of the apparatus shown in FIG. 1 will first be described in connection with the division of available data into two categories, namely, desired information and undesired information.

Figure 5:
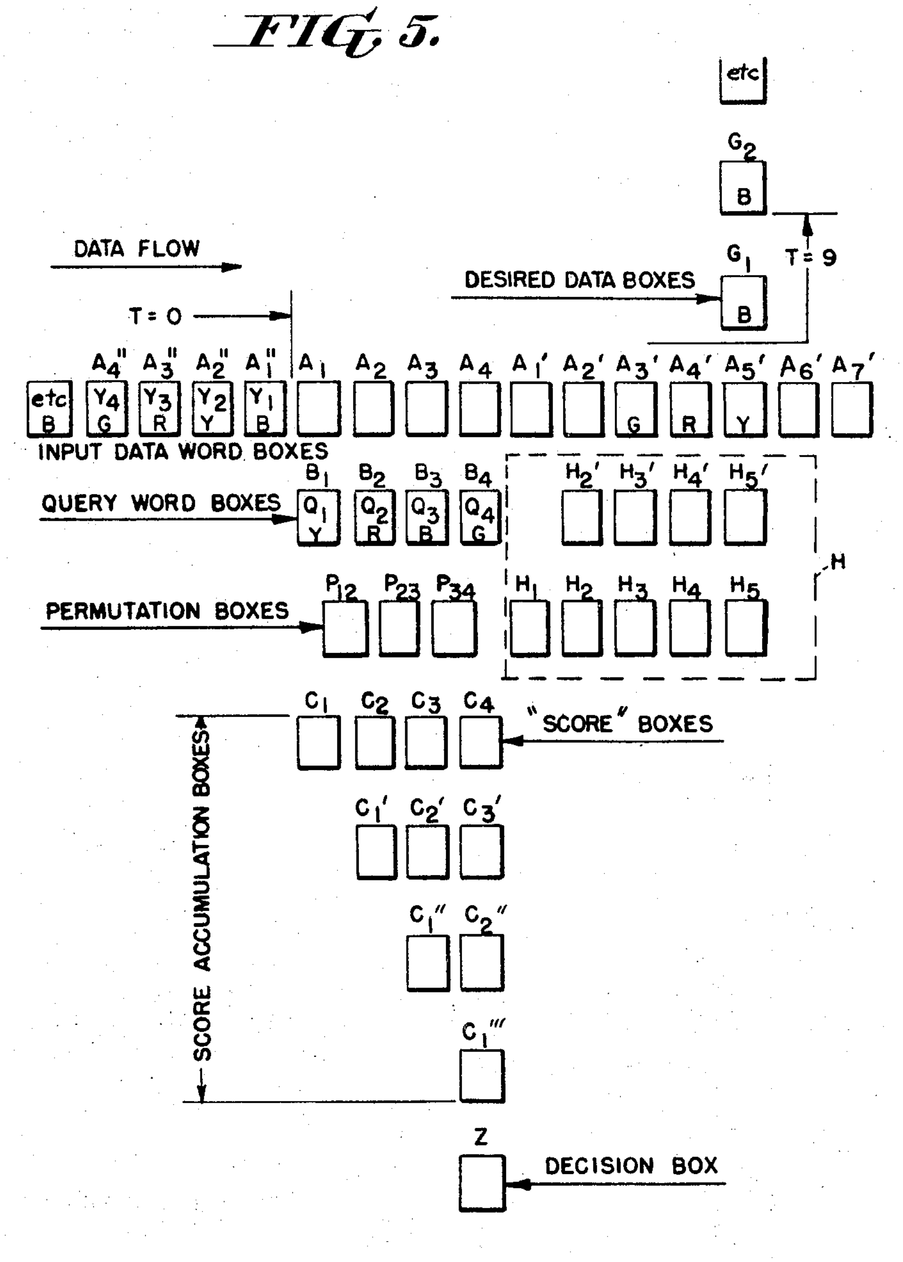
FIG. 5 is a schematic diagram illustrating a word permutation.

Referring to FIG. 5, it is supposed that at time $t=0$ the Input Data Words $Y_1$ $Y_2$, $Y_3$ and $Y_4$, which constitute a given Input Data Package, occupy the boxes $A_1''$, $A_2''$, $A_3''$, and $A_4''$, respectively. At the same time, Query Words $Q_1$, $Q_2$, $Q_3$ and $Q_4$ (that is, words against which the search is to take place) occupy the Query Word boxes $B_1$, $B_2$, $B_3$ and $B_4$. It is further supposed that with each operating signal, each Input Data Word moves one box to the right. Thus, following the first operating signal, corresponding to $t=1$, the Input Data Package occupies the boxes $A_1$, $A_1''$, $A_2''$ and $A_3''$. In the meantime, Query Words have remained stationary in $B_1$, $B_2$, $B_3$ and $B_4$.

Following each shift of the Input Data Words, comparisons are made between the corresponding pairs of Input Data Word boxes and Query Word boxes; i.e., $A_1$–$B_1$, $A_2$–$B_2$, $A_3$–$B_3$ and $A_4$–$B_4$. Where a word match occurs between a given pair, a unit is placed in the corresponding "score" box $C_1$, $C_2$, $C_3$ or $C_4$.

In the illustration given, it is seen that at $t=9$ the Input Data Package has passed over all of the Query Words and each Query Word has "seen" each Input Data Word. At this time, if, and only if, the "score" boxes each contain a unit, a unit will be placed in the decision box, Z. The presence of a unit in the decision box causes the Input Data Package to be led off via the output boxes $G_1$, $G_2$ . . . . Conversely, a zero in this box does not so alter the straight-through path of the data. In this way, a Desired Data is filtered from undesired data. Word matching is here independent of the word order in either the Query or Input Data Package.

*Score accumulation*

Following the exit of an Input Data Package from $A_4$, the "score" boxes are zeroized for the next Input Data Package. However, unless a gap of 4 Input Data Words is left between successive Input Data Packages, it is obvious that a problem arises at $t=5$ when a second Input Data Package, following on the heels of the first, enters $A_1$. At that time, if a word match is made between $A_1$ and $B_1$, the "score" boxes in effect indicate the combined scores of both Input Data Packages to that point. Also, when the last word of the first Input Data Package exits from $A_4$, the score boxes are zeroized and the partial score accumulation of the second Input Data Package is lost. Accordingly a modification is made to the "score" box system to allow it to accumulate separately the scores of succeeding Input Data Packages without leaving the wasteful gap. As before, when a match is made between $A_1$ and $B_1$, a unit is placed in $C_1$ and so forth. However, with each successive operating signal the contents of each C box is shifted diagonally down and to the right with the exception that no shift from the rightmost vertical row occurs until the last word of a transiting Input Data Package passes from $A_4$ to $A_1'$. At such time, if and only if, each C box in the rightmost row contains a unit, the Z box will be made to contain a unit as before. When the exiting shift occurs, the rightmost vertical row of C boxes is zeroized except where new units involving the next Input Data Package are shifted in. The appearance of a unit in the decision box Z causes a unit to appear also in box H. This unit remains in box H until the corresponding Input Data Package has completed its passage into the desired data output channel. By definition, a unit in box H causes the contents of $A_5'$ to be read into box $G_1$. Conversely, a zero in box H causes the contents of box $A_5'$ to be read into box $A_6'$.

The sequence in FIG. 5 shows how this arrangement of the score accumulator boxes preserves the scoring integrity between succeeding Input Data Packages. In this example, where the following word coding is employed: Y=Yellow, R=Red, B=Blue, G=Green, and V=Violet, two successive Input Data Packages are respectively V-G-Y-B and G-R-Y-B (reading from right to left). The Query Words Y, R, G, and B are located in $B_1$, $B_2$, $B_3$ and $B_4$. In the time interval $t=1$ through $t=12$ it is seen that G-R-Y-B satisfies the search criteria, whereas V-G-Y-B does not. Therefore, only G-R-Y-B is led off via the desired data output channel.

*Interword logic*

In the previous discussion it has been assumed that a simple logical product is always the desired logical relationship for the appearance of Query Words in the output. For example, in the last illustration, the condition that a unit appear in the decision box Z required that G and R and Y and B all appear in the Input Data Package. Logically then, $G\times Y\times R\times B=1$.

It is now required that other logical relationships also be capable of expression. For instance, in the sequence just used, the following logical relationships might have been desired: (to name a few) $G\times B\times(Y+R)$ or $R\times Y\times\overline{G}+B$ or $(R+Y+G)\times B$ or $G\times(R+Y)+B$. Quite clearly, in addition to the Query Words themselves, the logical interdependency which is specified to exist between them also delineates desired data. This relationship will be hereafter called Interword Logic. Generally speaking, logical summations between Query Words relax and enlarge the area of desired data specification, whereas logical multiplications produce the reverse effect. Any logical relationship may be expressed between the contents of $C_4$, $C_3'$, $C_2''$, and $C_1'''$ by plugboard.

*Word permutation*

Until now it has been assumed that word order is per se immaterial in the process of retrieval. It is obvious of course that in human expression of ideas, word order is of extreme importance and moreover the same words in different order convey totally different connotation. The permutation "Black and Tan," for instance, is associated with an Irish politcal movement. The permutation "Tan and Black" might be associated with a number of shoe shine advertisements. Strictly from the standpoint of information retrieval, word permutations, where it is possible to use them, are enormously restrictive. The combination "be," "not," "or," "to" is common to perhaps 99 percent of English literature; the permutation "To be or not to be" is common to but a minute fraction. In addition, the opportunity to use words in pairs or groups, nouns modified by adjectives, verbs modified by adverbs, affords obviously greater scope in describing desired data. For these reasons a means for entering desired word permutations is now described.

Referring to FIG. 5, it is seen that additional boxes $P_{12}$, $P_{23}$, $P_{34}$ have been inserted between the Query word boxes $B_1$, $B_2$, $B_3$, $B_4$ and the score boxes $C_1$, $C_2$, $C_3$ and $C_4$. These boxes will be referred to as word permutation boxes. When $P_{12}$, for example, contains a unit, box $B_1$ is permuted with box $B_2$ and so forth. If $P_{12}$ is in the unit state, $C_1$ and $C_2$ can be brought to the unit state only when matches occur simultaneously between pairs $A_1$–$B_1$ and $A_2$–$B_2$. If $P_{12}$ and $P_{23}$ are both in the unit state, a simultaneous match of $A_1$–$B_1$, $A_2$–$B_2$, and $A_3$–$B_3$ is required to change $C_1$, $C_2$, and $C_3$ to the unit state. Suppose that it is desired that BLUE, YELLOW and RED be permuted in that order in a logical product query involving RED, BLUE, GREEN and YELLOW. The effect of the permutation is to narrow the search from 24 *combinations* to 2 *permutations,* GRYB and RYBG. Accordingly, $B_1$, $B_2$, $B_3$ and $B_4$ are loaded respectively with R, Y, B and G and $P_{12}$ and $P_{23}$ are set in the unit state to indicate the permutation between B, Y and R. The system then is allowed to run from $t=0$ to $t=12$ as previously mentioned. Thus, although the two successive Input Data Packages YRBG and GRYB each contain identical Input Data Words, only the latter is extracted as desired data.

*Null characters*

Up to this point the term "word match" has been taken for granted to mean an identical match, character-for-character, bit-for-bit. The satisfaction of match conditions for less than an identical character for character correspondence is now set forth. Most English words (and foreign words, too) undergo mutation as word usage changes from one part of speech to another, one verb tense to another, singular to plural and so forth. For example,

PREPARES
PREPARE
PREPARED
PREPARATION
PREPARING
PREPAREDNESS
PREPARATIONS

If the file interrogator were not sure of the precise form in which a word might occur in a Desired Data Package, he could, of course, list all forms as separate Query Words. This is manifestly a cumbersome procedure. On the other hand, he could employ Null Characters Indicators. A Null Character Indicator, symbolized by Ø, bears a distinctive bit coding apart from all other characters. This indicator, when used in a Query Word means essentially, "any Input Data Character in this character space is an acceptable character match." For example, PREPARØØØØØØ as a Query Word would match any of the prior listed Input Data Words. As will be shown below, the presence of the Null Character Indicator is decoded from the Query Word as the latter is loaded into the B boxes. Such decodings are subsequently changed to the logical identity I in the corresponding character spaces.

*Data output*

The operation of the Z and H boxes in causing desired information to be switched out through the G boxes has been over-simplified. If all of the Input Data Packages were of the same length, the Z box, in conjunction with a simple counting mechanism, would be sufficient to gate Desired Data Packages to the G boxes as previously described. Mandatory equality of Input Data Packages is, however, an undesirable constraint since this results in a wastage of storage space. A preferred embodiment is to so construct the output system as to provide for Input Data Packages of *any length,* not to exceed some arbitrary length L, occurring in random order. To accomplish this, the gate to the G boxes is situated so that there are $L+1$ of the A′ boxes between the exit from the A boxes and the output gate. In addition, two rows of boxes, respectively $H_2'$, $H_3'$, . . . $H'_{(L+1)}$ and $H_1$, $H_2$, $H_3$ . . . $H_1$, . . . $H_L$ are inserted below the corresponding A′ boxes. These rows of boxes are pseudo output boxes and the truth table governing their operation is as follows:

| Condition | H | H′ |
|---|---|---|
| (a) Contents of the A′ box above has not been decided upon. (It is not yet known whether it consists of desired information.) | 1 | 0 |
| (b) Contents of the A′ box above has been decided upon; it is part of a Desired Data Package | 0 | 1 |
| (c) Contents of the A′ box above has been decided upon; it is not part of a Desired Data Package | 0 | 0 |
| (d) H=1 and H′=1 are constrained from simultaneous occurrence | X | X |

The output scheme operates as follows. At some time $t_1$ the first word of a data package exits from $A_4$ to $A_1'$. As this occurs, a unit is propagated in box $H_1$. With the next sifting signal, boxes $A_1'$ and $A_2'$ are occupied by the first two words of the Input Data Package and units appear in boxes $H_1$ and $H_2$. This procedure is reiterated until the last word of the Input Data Package passes from $A_4$ to $A_1'$—that is, until the completion of a minor cycle. A Minor Cycle is defined to be the time interval required for an Input Data Package to pass entirely through the A boxes. At this time a decision signal Z is formed as previously outlined. If the decision signal is a unit, the units then existing in the H row will be shifted diagonally upward and to the right upon receipt of the next shifting signal thereafter. Their place is taken by zeroes. If, on the other hand, Z is a zero, the diagonal shift of units then existing in the H row will not take place. Instead, these units are merely replaced by zeroes.

The end result of this procedure is that the words of an Input Data Package march up to the Output Gate accompanied by a corresponding signal in the row of H′ boxes. If this corresponding signal is a unit, the accompanied word is "Desired Data" and will be read out via $G_1$, $G_2$ . . . On the other hand, if this signal is a zero, the accompanied word will not be so read out.

*Compartor unit*

Against the background provided by the foregoing elementary presentation of the underlying concept of operation, the Comparator Units 33, 34 will be more particularly described. As a prelude to this, formats of the input data and of the query data are initialy defined.

*Input data*

Figures 6, 8:
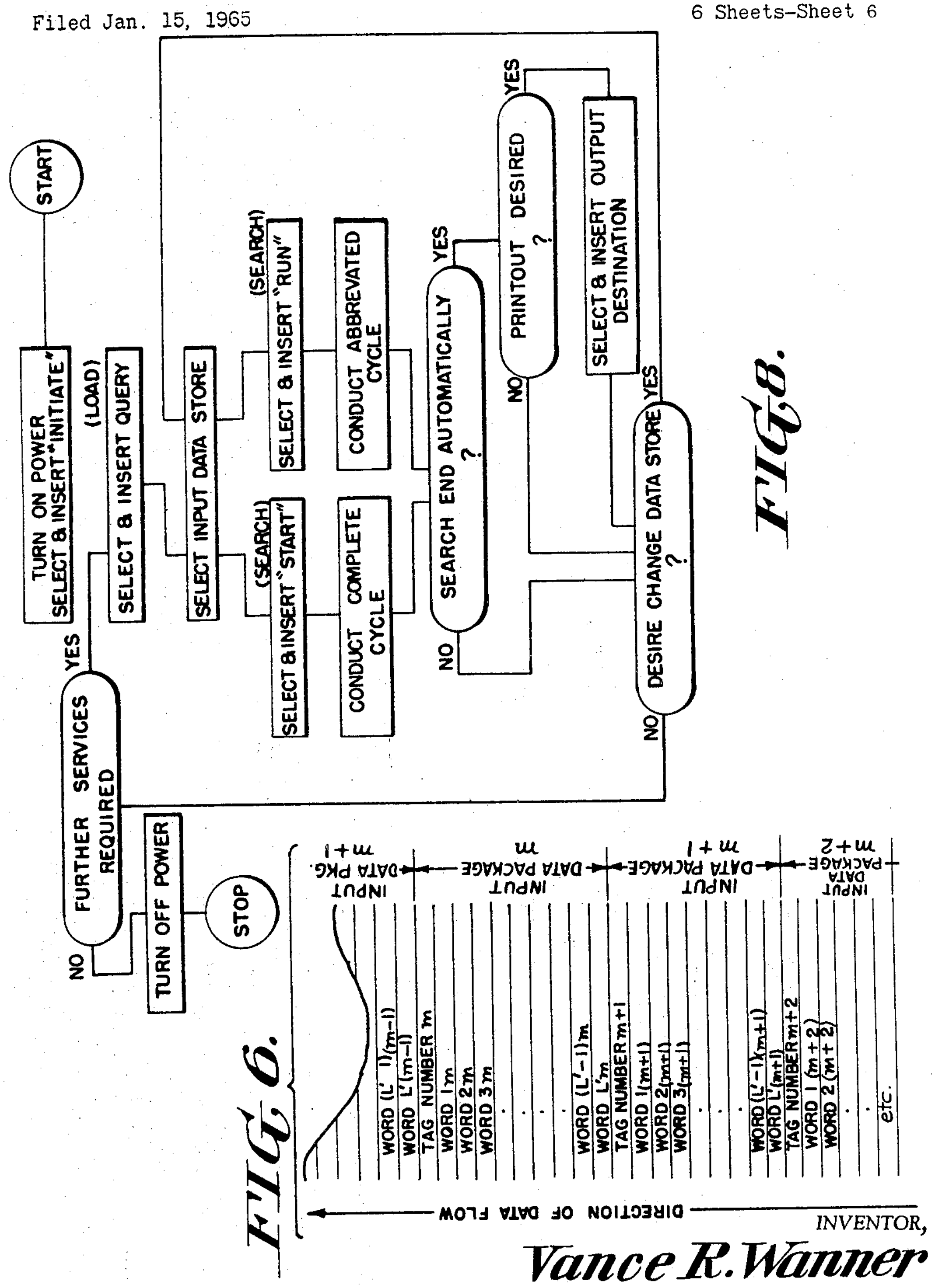
FIG. 6 shows an arrangement of input data.
FIG. 8 illustrates a comparator unit operator's flow chart.

In the preliminary discussion of the Data Storage System 15 it was pointed out that the Input Data Package consists of a column of Input Data Words headed by a tag number, the tag number being unique to the given Input Data Package. This is illustrated in FIG. 6. The following definition is made with respect to Input Data:

(a) $Y_m$=The *m*th Input Data Package in the Data Store. *m*=1, 2, 3, . . . *m*, . . . , M. M equals the number of Input Data Packages in the data store at any given time. Since the sizes of the Input Data Packages vary, M is a variable, dependent upon the Data Store capacity and the average length of the stored packages.

*Query data*

The Query Message conveys into the Comparator Unit the following pieces of the interrogator's inquiry: Query Words are Alpha numerical words (or word parts) against which the search takes place. Query Words may have one of two possible usage modes. In the first or affirmative mode, the Query Word, if present in an Input Data Package, may mean that the Input Data Package is Desired Data. In the second, or negative mode, the Query Word, if present, may mean that the Input Data Package is undesired. Null Character Indicators are Special Character codings for the purpose of signifying the logical identity I in a given character space. Word Permutation Indicators are Special auxiliary bits to indicate permutations between Query Words. Interword Logic Indicators are Special pairs of bits to indicate the presence (or absence) of a Query Word (positive or negative mode) in a Query Word logical product. The expression of Interword Logic is in the form of a simple logical sum of logical products. It states the usual AND/OR/NOT relationships between Query Words.

The Query Message consists of two parts. Part One of the Query Message contains the Query Words, the Null Character Indicators, and the Word Permutation Indicators. The Null Character Indicators are superimposed in the character coding of the Query Words, and as will be shown later, are read out through a decoder as the Query Message is loaded into the Comparator Unit. The Word Permutation Indicators are carried in channel $(I+l)$ of Part One ($I$=System constant). A unit in this channel next to a Query Word indicates that the Query Word is to be permuted with the next Query Word. Conversely, a zero indicates no such permutation. A string of words which is permuted will be thereafter treated logically as if it were but a single word. Therefore, if the Query Word (or others in the permuted string) are to be used unpermuted elsewhere in the expression of Interword Logic, they must be repeated as Query Words without the Word Permutation Indicators.

Query Message Part Two contains the Interword Logic for a given search. The overall dimensions of Part Two are identical to those of Part One. Each row in Part Two pertains to a specified logical product of Query Words. As mentioned earlier, the entire expression of Interword Logic is a logical *sum* of logical *products*. Inasmuch as there are K (system constant) rows in Query Message Part Two, there may be as many as K such logical products in the summed expression.

Each of the K logical products is made up of not more than J (system constant) elementary terms. An elementary term relates to the retirement for the occurrence or non-occurrenece of either mode of a given Query Word ($V_j$) in a particular logical product. Information regarding an elementary term is conveyed by a corresponding bit pair. It is noted at this time that a constraint is imposed upon the selection of the system constants J and K such that $(I+1)/2 \geqq J$ (a bit pair must be provided for at *least* every Query Word). It is further noted that a given *column* of bit pairs in the format for Query Message Part Two, say the @th, pertains to just one Query Word, the *j*th.

As an example of Query Message Part Two it is supposed that a Query Message consists of 5 Query Words, $V_1$, $V_2$, $V_3$, $V_4$, and $V_5$. It is supposed also that the interrogator had established the following logical dependency as a search requirement:

$$(\text{IWL}) = V_1(V_2 + V_3V_4)\overline{V}_5$$

The above reduces to the following simplified logical sum of logical products:

$$(\text{IWL}) = V_1V_2\overline{V}_5 + V_1V_3V_4\overline{V}_5$$

If it is assumed that $J$=5 and $I+1$=11, Query Message Part Two takes the following form: ($J$=$K$ [arbitrarily]).

| | | | 1 | 2 | 3 | 4 | 5 | 6 | 7 | 8 | 9 | 10 | 11 |
|---|---|---|---|---|---|---|---|---|---|---|---|---|---|
| | | 5 | 0 | 0 | 0 | 0 | 0 | 0 | 0 | 0 | 0 | 0 | 0 |
| Loading | | 4 | 0 | 0 | 0 | 0 | 0 | 0 | 0 | 0 | 0 | 0 | 0 |
| Direc- | k | 3 | 0 | 0 | 0 | 0 | 0 | 0 | 0 | 0 | 0 | 0 | 0 |
| tion | | 2 | 1 | 0 | 0 | 0 | 1 | 0 | 1 | 0 | 0 | 1 | 0 |
| | | 1 | 1 | 0 | 1 | 0 | 0 | 0 | 0 | 0 | 0 | 1 | 0 |

Figure 3:
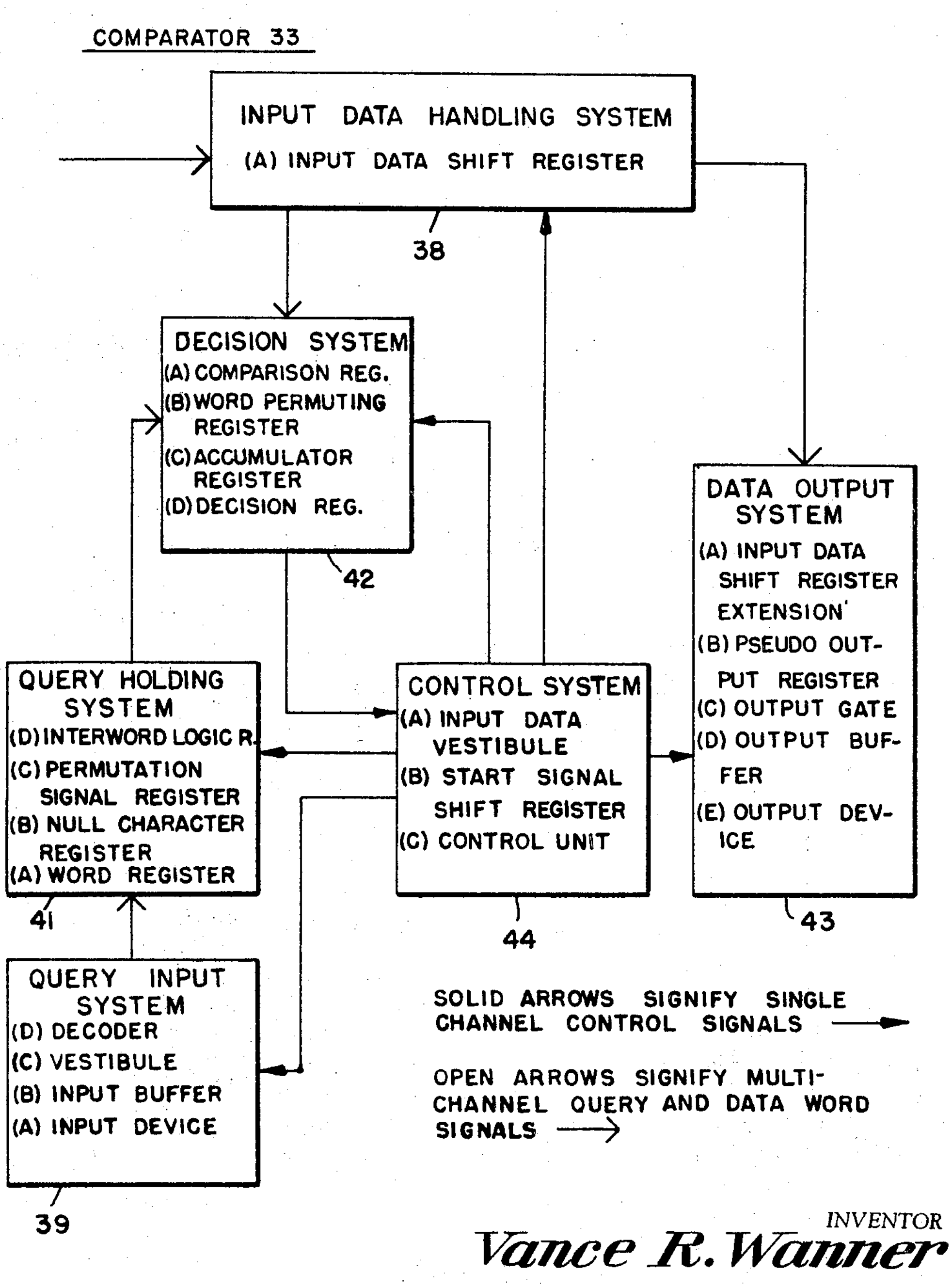
FIG. 3 is a block diagram of a comparator unit.
Figure 4:
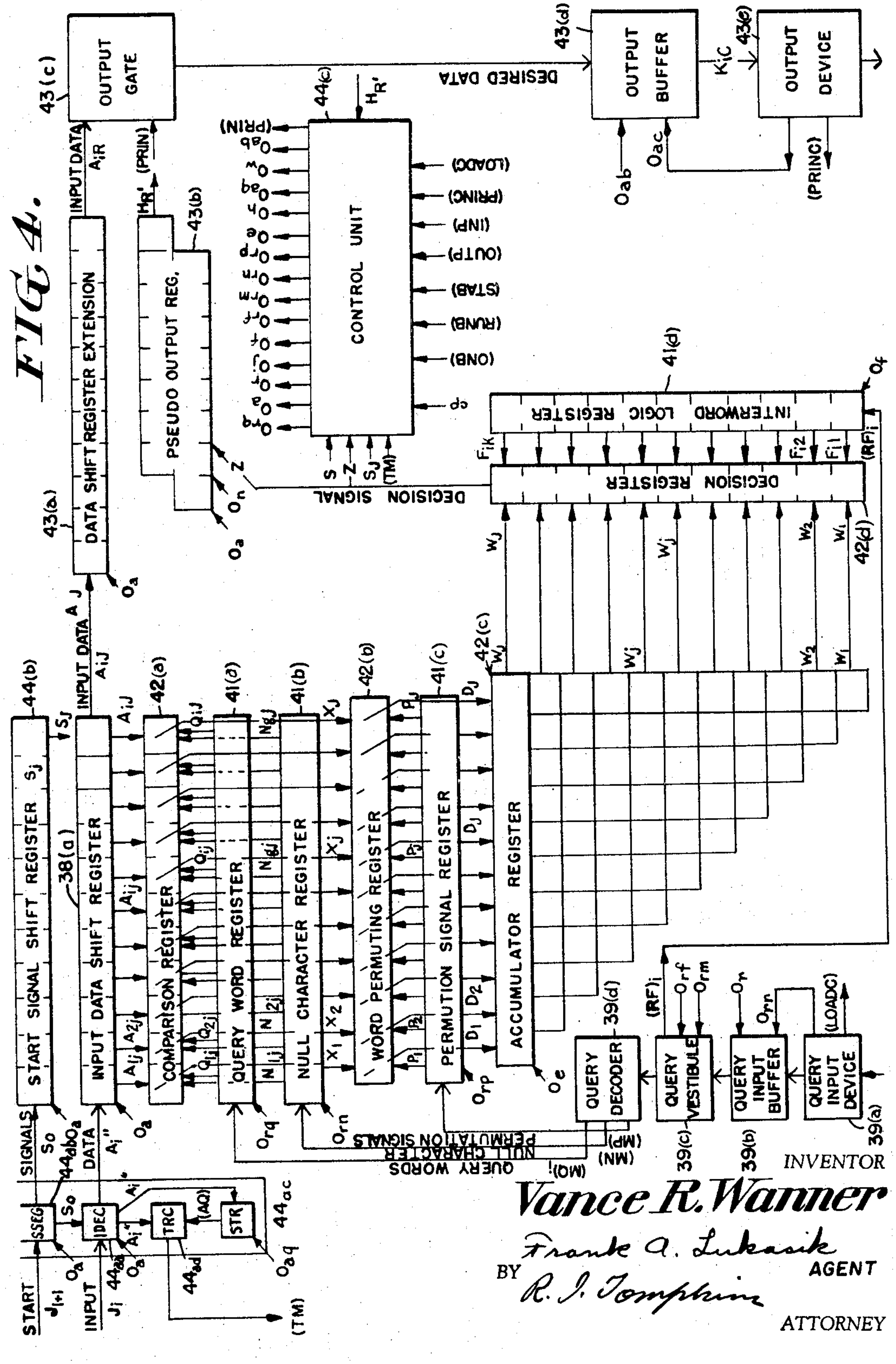
FIG. 4 illustrates a composite diagram of a comparator unit.

As shown in FIGS. 3 and 4, a Comparator Unit 33 is composed of six basic sub-systems, respectively: Input Data Handling System 38, Query Input System 39, Query Holding System 41, Decision System 42, Data Output System 43, Control System 44.

The Input Data Handling System 38 conveys Input Data Packages into the Comparator Unit. Structurally it consists of a single part, the Input Data Shift Register 38*a*, which has I parallel shift register channels corresponding to the I bit positions of the Input Data Words. Each channel in the Input Data Shift Register has J (as previously defined) shift steps. Hence, at any time the Input Data Shift Register may hold J Input Data Words. Functionally, the Input Data Shift Register serves the purposes outlined in the prior description of the "A" boxes. The outputs of this unit are sent to the Comparison Register in the Decision System 42 via $I \times J$ channels.

The Query Input System 39 performs the function of transferring the Query Message from the human interrogator to the Query Holding System 41. To perform this function, it has the following four parts:

Query Input Device 39*a*
Query Input Buffer 39*b*
Query Vestibule 39*c*
Query Decoder 39*d*

The Query Input Device 39*a* consists of a special keyboard unit with which the human interrogator assembles the Query Message in the form already described and inserts it into the Comparator Unit via the Query Input Buffer 39*b*. The Query Input Device 39*a* is not necessarily part of the Comparator Unit and is here included for clarity and completeness only.

The Query Input Buffer 39b is a special storage unit of $I+1$ parallel channels for the purpose of receiving a Query Message from the Query Input Device 39a and for releasing it at the proper time to the Query Holding System 41. The Query Input Buffer 39b thus serves as an interface between the Comparator Unit and the external world. During the period in which the Query Input Buffer 39b is receiving a Query Message from the Query Input Device 39a it is controlled by operating signals from that device. During the time the Query Input Buffer 39b is releasing a Query Message it functions in response to signals from the Control System 44 of the Comparator Unit 33.

The Query Input Vestibule 39c is a gating unit which controls the destination of Query Message signals leaving the Query Input Buffer 39b for the Query Holding System 41 during the loading phases of the Comparator Unit 33. The Query Input Vestibule 39c gates Query Message Part One through the Query Decoder 39d to the Query Word Register 41a, the Null Character Register 41b, and the Permutation Signal Register 41c. It subsequently gates Query Message Part Two to the Interword Logic Register 41d. The latter registers are components of the Query Holding System 41.

The Query Decoder 39d operates upon Query Message Part One to detect Null Character Indicators existing in Query Words. This action takes place prior to the loading of Query Words into the Query Word Register 41a. The Null Character Indicators, thus detected, become Null Character Signals and are directed to the Null Character Register 41b.

*Query holding system*

The purpose of the Query Holding System 41 is to hold the individual parts of the Query Message during a major cycle of search operations. During the actual search operations, the Query Holding System 41 supplies continuous information to the Decision System 42. The Query Holding System 41 consists of the following component parts:

Query Word Register 41a
Null Character Register 41b
Permutation Signal Register 41c
Interword Logic Register 41d

The Query Word Register 41a receives and holds the Query Words as they are fed from the Query Input System 39. The Query Word Register 41a is a special register having I parallel shift register channels each containing J steps. During the query loading phase it functions as a shift register and during the search phase it sends Query Word Bit Signals to the Comparison Register 42a in the Decision System 42 simultaneously on $(I\times J)$ channels.

The Null Character Register 41b receives and holds the Null Character Signals as they are fed in by the Query Input System 39. During the loading phase it functions as a shift register of G (System constant) parallel shifting channels each having J shift steps. During the search phase, the Null Character Register 41b sends Null Character Signals to the Comparison Register 42a in the Decision system 42 simultaneously on $(G\times J)$ channels.

The Permutation Signal Register 41c receives and holds Word Permutation Indicators fed in via the Query Input System. The Permutation Signal Register is a shifting register having but a single channel of $(J-1)$ shift steps. During the search phase it serves Word Permuting Signals continuously to the Word Permuting Register 42b in the Decision System 42 on $(J-1)$ channels simultaneously).

The interword Logic Register 41d receives and holds interword Logic Data which is fed to it by the Query Input System 39. This register functions as a shift register of $(I+1)$ parallel channels, each of J steps. During the search phase the Interword Logic Register 41d provides Interword Logic Signals to the Decision Register 42d in the Decision System 42 simultaneously on $(I+1)\times J$ channels.

*Decision system*

The purpose of the Decision System 42 is to "bounce" input data against query data in order to produce decision signals which result in the eventual output of desired data. The Decision System consists of the following four parts:

Comparison Register 42a
Word Permuting Register 42b
Accumulator Register 42c
Decision Register 42d

The Comparison Register 42a makes comparisons between Input Data Words and Query Words (as modified by Null Character Signals) in order to produce Basic Word Match Signals. The Comparison Register 42a receives inputs as previously described from the Input Data Shift Register 38a $(I\times J$ channels), the Query Word Register 41a $(I\times J$ channels), and the Null Character Register 41b $(G\times J$ channels). The output of the Comparison Register 42a, Basic Word Match Signals, are sent to the Word Permuting Register 42b.

The Word Permuting Register 42b is a logical network which modifies the Basic Word Match Signals in accordance with Word Permuting Signals. The Word Permuting Register 42b receives inputs from the Comparison Register 42a on J channels and from the Permutation Signal Register 41c via $(J-1)$ channels. The outputs of the Word Permuting Register 42b consist of adjusted Word Match Signals which are sent to the Accumulator Register 42c on J channels.

The Accumulator Register 42c performs the functions outlined in the previous schematic discussion for the "modified score box" system. It thus keeps individual tallies of the Adjusted Word Match Signals Corresponding to the Input Data Package transiting the Input Data Shift Register 38a. The latter signals are received from the Word Permuting Register 42b. At the conclusion of the passage of an Input Data Package through the Input Data Shift Register 38a, the Accumulator 42c sends its Accumulated Word Match Signals to the Decision Register 42d. Since there are J such Adjusted Word Match Signals, the transmission is accomplished simultaneously on J channels.

The Decision Register 42d operates on the Accumulated Word Match Signals received from the Accumulator Register 42c together with the Interword Logic Signals received from the Accumulator Register 41d in order to produce Decision Signals which are sent to the Control Unit 44c of the Control System 44. The Decision Signals are sent via a single channel and ultimately they control the dichotomy of Input Data Packages which results in the output of Desired Data.

*Data output system*

The purpose of the Data Output System 43 is actually perform the data separation process just mentioned and to provide the Desired Data to the human interrogator. The output System 43 consists of the following components:

Input Data Shift Register Extension 43a
Pseudo Output Register 43b
Output Gate 43c
Output Buffer 43d
Output Device 43e

The Input Data Shift Register Extension 43a, as its name implies, is an extension of the previously described Input Data Shift Register 38a. Recalling that a Decision Signal is not produced until an Input Data Package has entirely transited the Input Data Shift Register 38a, the extension serves as a temporary storage track for the Input Data Package until this act is consummated. After the Decision Signal has been formed in connection with a given Input Data Package, the content of the Input Data Shift Register Extension 43*a* if it constiutes Desired Data as determined by the Decision System 42, will be discharged to the Output Buffer 43*d* via the Output gate 43*c*.

The Pseudo Output Register 43*b* originates Pseudo Output Signals which parallel Input Data Words exiting from the Input Data Shift Register Extension 43*a* and serve to identify Desired Data to the Output Buffer 43*d*. Its function is therefore analogous to the H–H′ system of boxes in FIG. 5, and like that system it consists of a double channeled shift register. The Pseudo Output Register 43*b* operates in response to signals from the Control Unit 44*c* in the Control System 44 and provides its output to the Output Buffer 43*d*.

The Output Gate 43*c* is a switching unit of I parallel channels located between the Input Data Shift Register Extension 43*a* and the Output Buffer 43*d*. This gate serves to isolate the Output Buffer 43*d* from the Input Data Shift Register Extension 43*a* during such times as the Output Buffer 43*d*, under the control of the Output Device 43*e*, is unloading Desired Data.

The Output Buffer 43*d*, like the Query Input Buffer 39*b*, is an interface with external systems. This buffer, in the form of a double ended shift register, serves as a temporary storage for Desired Data Packages until such time as the human operator wills that they be printed out via the Output Device 43*a*.

The Output Device 43*e* consists of a device for displaying Desired Data to the human interrogator. The Output Device 43*e* is not a part of the Comparator Unit 33 and its inclusion at this point is for clarity only.

*Control system*

The Control System 44 provides the means for both human control and automatic internal control for governing the operation of the systems and sub-systems of the Comparator Unit 33. The Control System 44 is made up of the following parts:

Input Data Vestibule 44*a*, including:
- (1) Input Data Entrance Gate 44*aa*
- (2) Start Signal Entrance Gate 44*ab*
- (3) Starting Tag Register 44*ac*
- (4) Tag Comparison Register 44*ad*

Start Signal Shift Register 44*b*
Control Unit 44*c*, including:
- (1) Operator's Console 44*ca*
- (2) External Input Signal Generator 44*cb*
- (3) Phase Signal Generator 44*cc*
- (4) Phase Initiation and Termination Signal Generator 44*cd*
- (5) Operating Signal Generator 44*ce*
- (6) Indicator Light Signal Generator 44*cf*

Figure 7:
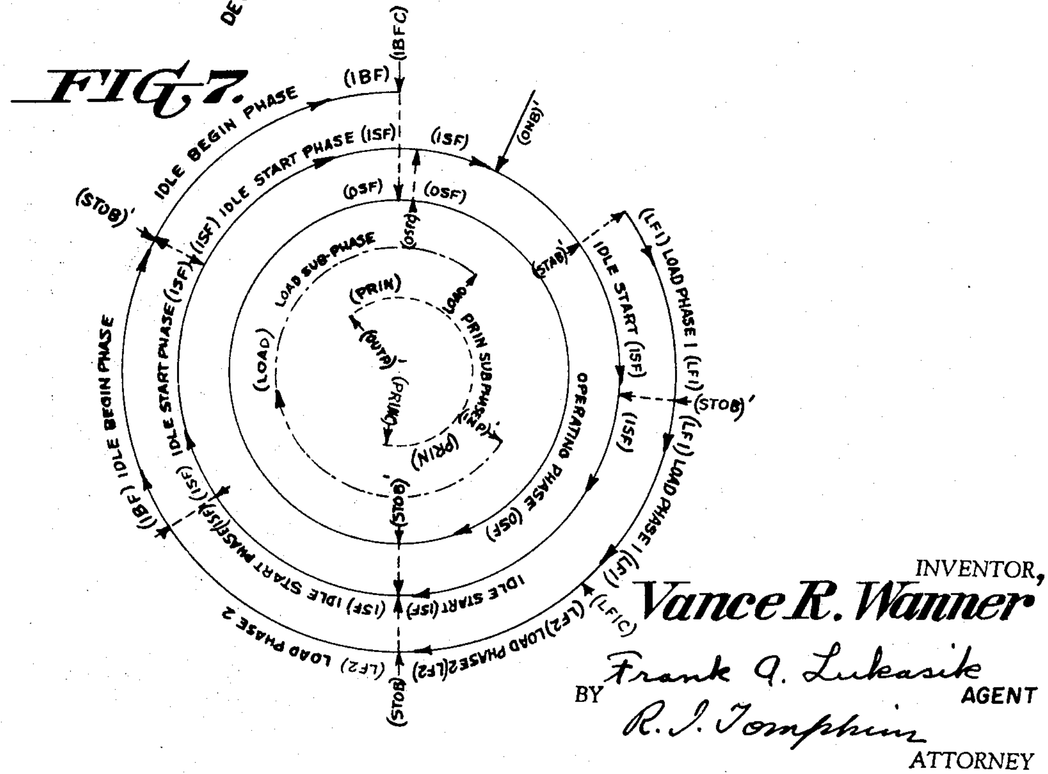
FIG. 7 is a system phase diagram.

The Input Data Vestibule 44*a* and its components are associated with the initiation and termination of a search major cycle. In this respect it functions as an eye-memory unit. The action of the Input Data Vestibule 44*a* is analogous to the performance of a human being witnessing a motion picture at a continuous showing where entrance may be made at any point with respect to the beginning and ending of the program. Where, in this analogy, the individual notes the point in the story at which his entrance is made and exits (usually) when this point is again encountered, the Input Data Vestibule 44*a* notes the beginning point of a major cycle in any given Data Store and initiates signals to end search operations when this point is re-encountered. The beginning point of a major cycle may be any convenient place randomly chosen at the time of the search and is not restricted to a single preselected starting place. The Input Data Entrance Gate 44*aa* is a special gate of I parallel channels located in the data stream immediately prior to the entrance of Input Data to the Input Data Shift Register 38*a*. The Input Data Entrance Gate 44*aa* taps the flow of Input Data and provides it to the Input Data Shift Register 38*a*, the Starting Tag Register 44*ac*, and the Tag Comparison Register 44*ad*. The Starting Tag Register 44*ac* is a special memory register of I bits. At the commencement of a search the first encountered Input Data Package Tag Number is accepted and stored by the Starting Tag Register 44*ac*. Thereafter, during the same major cycle, the bits of this initial Input Data Package Tag Number are an output to the Tag Comparison Register 44*ad*. The contents of the Starting Tag Register 44*ac* are replaced at the initiation of each new search. The Tag Comparison Register 44*ad* is a special register for the purpose of comparing the contents of the Input Data Entrance Gate 44*aa* and those of the Starting Tag Register 44*ac*. When a match is made in this register, a signal is originated which ends the major cycle, causing the system to idle. The Start Signal Entrance Gate 44*ab* is a one channel gate which senses the location of the start of each Input Data Package entering the Comparator Unit 33. Recalling that the Input Data Package Start Signals are conveyed by channel $I+1$, the Start Signal Entrance Gate 44*ab* reads this channel continuously prior to its entry into the Start Signal Shift Register 44*b*. Where an Input Data Package Start Signal is encountered, the Start Signal Entrance Gate 44*ab* makes an output to the Control Unit 44*c*. This signal is used to control the reading-in of the initial Input Data Package Tag Number into the Starting Tag Register 44*ac*. The Start Signal Shift Register 44*b* is a single channel shifting register for the purpose of shifting the contents of channel $I+1$ in parallel with the shift in channels $i=1, 2, 3, \ldots, i, \ldots,$ I through the Input Data Shift Register 38*a*. The output of this register, which is sent to the Control Unit 44*c*, senses the completion of a minor cycle. Keeping in mind that the Starting Tag Number for one Data Package follows immediately after the last word of the preceding Input Data Package, the appearance of a unit output signifies the exit of an Input Data Package from Input Data Shift Register 38*a* and therefore the end of a minor cycle. The end of a minor cycle, as previously described in the schematic description, is the occasion for a Decision Signal relative to the exited Input Data Package. The Operator's Console 44*ca* provides the means whereby the Comparator Unit 43 is placed under the supervisory control of a human operator. Accordingly, physical means are provided thereon for indicating the status of the system as well as for selecting and inserting human control signals. The latter, as illustrated in FIG. 7, result in the following external controls:

(a) A power "ON–OFF." In the "ON" position, the system clock pulse is admitted to the Control System 44 but there is no other activity taking place in the Comparator Unit 33.

(b) An "Initiate Opeartions" insert button signal, (ONB)′. This signal is inserted after the power switch above has been placed in the "ON" position in order to set the equipment in an idling condition from which subsequent search operations may be initiated. (In other words, (ONB)′ places the equipment at the right initial place in the operating loop.)

(c) A "Start Search" insert button signal, (STAB)′. This signal reloads the Query Holding System and initiates a major cycle search through a preselected Input Data Store.

(d) A "Run Search" insert button signal, (RUNB)′. This signal initiates a major cycle search through a preselected Input Data Store without reloading the Query Holding System. (That is, the search is conducted with the previously existing Query Message.)

(e) A "Stop Search" insert button signal, (STOB)′. This signal terminates a major cycle search and causes the system to idle in a condition from which a new search may be initiated by (STAB)' or (RUNB)'.

(f) An "Input" insert button signal, (INP)'. This signal (when inserted at the proper time) causes Query Data to be loaded into the Query Input Buffer from a remotely located Query Input Device.

(g) An "Output" insert button signal, (OUTP)'. This signal (when inserted at the proper time) causes the contents of the Output Buffer to be unloaded to the remotely located Output Device.

The indicators on the Operator's Console consist of a Decision Counter and Indicator Lights. The Decision Counter counts the number of Desired Input Data Packages encountered during a major cycle of search. In many cases it is preferable to obtain a count of such, prior to deciding upon a printout. This is particularly true where the Query Message provides for a "relaxed" search. (In the extreme condition, the system tries to provide an entire Input Data Store and consequently overflows the Output Buffer.) The Indicator Lights on the Operator's Console 44_ca_ indicate the current operating status of the system as well as requests for its use by remotely located interrogation stations. The External Signal Generator 44_cb_ converts the manually inserted signals into signals digestible by the physical system. In addition, it imposes constraints between these external inputs in order to prevent mal-operation of the system. The Phase Signal Generator 44_cc_ provides for the generation of operating phase signals. These phase signals are used to construct operating signals and indicator light signals. The Phase Initiation and Termination Signal Generator 44_cd_ provides for the generation of signals which terminate one operating phase and initiate a subsequent phase in the operating cycle. The Operating Signal Generator 44_ce_ provides control signals which actually operate the components of the Query Input 39, the Query Holding 41, the Decision System 42, and the Data Output Systems 43 previously described. The Indicator Light Signal Generator provides for the generation of signals controlling the operation of the Indicator lights on the Operator's Console 44_ca_.

*Operational description*

In this section the Comparator Unit 33 is described from an operational standpoint. Consequently, the operating phases are first defined and outlined. The Comparator Unit 33 is then taken through a search cycle and the sequence of events is described. The following notations are introduced as follows: unbracketed capitalized expressions, ISF for example, will be taken to indicate operational phases. Conversely, bracketed expressions, (ISF) for example, will be taken to indicate operating signals.

*Operating phases*

The Comparator Unit is divided into seven phases as follows:

(1) OFF PHASE, symbolized by OFF. Period during which there is no power to the system and during which there is no activity of any kind therein.

(2) ON PHASE, symbolized by ON. Period during which there is power to the system and clock pulses to its Control Unit but no further activity in the six basic systems. This phase is a preliminary to placing the system in an idling condition.

(3) IDLE STOP PHASE, symbolized by ISF. Period during which Input Data circulates through the Input Data Entrance Data Gate 44_aa_, the Input Data Shift Register 38_a_, the Input Data Shift Register Extension 43_a_, and the Output Gate 43_c_, but during which no loading or searching operations are underway (except for external loading or unloading).

(4) LOAD PHASE ONE, symbolized by LF1. Operational period during which Query Message Part One is brought out of the Query Input Buffer 39_b_ and placed in the appropriate locations in the Query Holding System 41. The loading of the Query Holding System 41 from the Query Input Buffer 39_b_ displaces Query Data previously located there.

(5) LOAD PHASE TWO, symbolized by LF2. Operational period during which Query Message Part Two is brought from the Query Input Buffer 39_b_ and placed in the appropriate place (the Interword Logic Register 41_d_) in the Query Holding System 41.

(6) IDLE BEGIN PHASE, symbolized by IBF. Operational period during which the system searches for an initial Input Data Package Tag Number at which point to begin a major cycle.

(7) OPERATING SEARCH PHASE, symbolized by OSF. Period during which the system conducts a search through a major cycle.

*Phase initiation and termination*

The above phases are started and terminated in the following manner:

(a) OFF This phase is commenced by placing the "ON"–"OFF" power switch in the "OFF" position. It is ended when this switch is placed in the "ON" position.

(b) ON This phase is initiated by placing the power switch in the 'ON" position. It is terminated by inserting the signal (ONB)' which places the system in ISF. It is also, of course, ended by placing the power switch in the "OFF" position.

(c) ISF This phase is commenced by inserting the signals (STOB)' or (ONB)'. In addition, it is also started by the completion of OSF. ISF is ended by the insertion (STAB)' or (RUNB)', or when the power switch is turned to the "OFF" position.

(d) LFI This phase is initiated by the insertion of (STAB)', and is terminated by the completion of loading Query Message Part One in the Query Holding System 41. (Query Word Register 41_a_, Null Character Register 41_b_, and Permutation Signal Register 41_c_.) It is also terminated by placing the power switch in the "OFF" position.

(e) LF2 This phase is started by the completion of LF1. It is terminated when Query Message Part Two is fully loaded in the Query Holding System 41. (Interword Logic Register 41_d_.) It is also ended when the power switch is placed in the "OFF" position.

(f) IBF This phase is started by the completion of LF2 or by the insertion of (RUNB)' during ISF. It is terminated when the initial Input Data Package Tag Number is encountered at the Input Data Vestibule 44_a_, or by the insertion of (STOB)'. It is also terminated by placing the power switch in the "OFF" position.

(g) OSF This phase is initiated by the completion of IBF. It is terminated by the insertion of (STOB)', or by the completion of a major cycle of search. It is also terminated by placing the power switch in the "OFF" position.

*System operating cycles*

System operation is normally made up of sequentially ordered phases. When a series of phases forms a closed loop, the operation forms an operating cycle. The Complete Cycle is initiated from ISF by the insertion of (STAB)' and subsequently runs through LF1, LF2, IBF, OSF, and ISF, in that order. It is terminated automatically when ISF is resumed. This cycle may be also terminated during OSF by the insertion of (STOB'), (not shown), which returns the system to ISF. Of course, this cycle may always be also ended by placing the power switch in the "OFF" position. The Abbreviated Cycle may be initiated from ISF by the insertion of (RUNB)'. It subsequently runs through IBF, OSF, and ISF in that order. As before, it may be terminated manually from OSF by means of (STOB)', and at any time by the removal of power from the system. The OFF phase and the ON phase are not considered part of the foregoing operating cycles since they do not routinely occur during every search operation. Instead they may be considered as preliminary steps to routine operation. Activity within the basic systems varies according to phase. FIG. 8 is a composite diagram of the Comparator Unit 33 summarizing the inputs and outputs as well as displaying the general arrangement.

*Operational description*

(1) Assuming that the system is initially in the power "OFF" state, the placing of the power switch in the "ON" position changes the system phase from OFF to ON. In the latter phase there is no significant activity in any of the six basic systems except that the clock pulse (cp) is admitted to the Control Unit 44c and the system is ready to be placed in ISF.

(2) The insertion of (ONB)' changes the system phase from ON to ISF. During this phase the activity in the basic systems is as follows:

(a) In the Input Data Handling System 38, Input Data Bits, $Y'_{mij}$, appear on the input channels and are stepped through the Input Data Shift Register 38a. Following each shifting pulse $O_a$, an output $A_{ij}$ appears to the Comparison Register 42a.

(b) In the Query Input System 39, the Query Input Buffer 39b may be loaded from the Input Device 39a at the option of the operator. There is no output from the Query Input Buffer 39b to the Query Holding System 41.

(c)(1) Within the Query Holding System 41 the individual components make outputs to the Decision System 42 as follows:

(a) The Query Word Register 41a sends Query Word Bit Signals, $Q_{ij}$, to the Comparison Register 42a.

(b) The Null Character Register 41b sends Null Character Signals $N_{gj}$, to the Comparison Register 42a.

(c) The Permutation Signal Register 41c sends Word Permuting Signals $P_j$, to the Word Permuting Register 42b.

(d) The Interword Logic Register 41d sends Interword Logic Signals $F_{jk}$, to the Decision Register 42d.

(2) Following the initial start-up of the system (when there has been no Query Message yet loaded into the Query Holding System) each of the outputs mentioned in (c)(1) above is zero.

(3) Subsequent to the initial loading of the Query Holding System 41, the outputs mentioned in (c)(1) above are in accordance with the bit structure of the Query Message then existent in the Query Holding System 41.

(d) In the Decision System 42, although there are inputs $A_{ij}$ from the Input Data Shift Register 38a, and inputs $Q_{ij}$, $N_{gj}$, and $P_j$ from the components of the Query Holding System 41, there are no Decision Signals Z produced. This is due to the fact that there are no Accumulator Register Operating Pulses $O_e$ during this phase. In turn, there are no outputs $W_j$ from the Accumulator Register 42c to the Decision Register 42d.

(e)(1) In the Output System 43, the Input Data flows through the Input Data Shift Register Extension 43a and Output Gate 43c but is not read into the Output Buffer 43d. The Pseudo Output Register 43b, due to a lack of operating signals during this phase, makes no output to the Output Buffer 43d; hence the Output Buffer 43d accepts no input from the Output Gate 43c.

(2) The Output Buffer 43d may be unloaded to the Output Device 43e at the option of the operator. (The system must have completed at least one operating cycle before any output from the Output Buffer 43 is possible.)

(3) The manual insertion of (STAB)' or (RUNB)' instigates an operating cycle by changing the system phase from ISF to LFI (or IBF as the case may be). Since the Complete Cycle includes the Abbreviated Cycle, this description will continue on the assumption of a Complete Cycle. The following activity takes place in the six basic systems:

(a) The Query Input System 39, under control of signals from the Control System 44, proceeds to load Query Message Part One into the Query Holding System 41. This process goes as follows:

(1) The Query Input Buffer 39b, in response to Query Input Buffer Internal Loading Pulse $O_r$, makes its output $R_i$ to the Query Input Vestibule 39c.

(2) The Query Input Vestibule 39c, in response to the Query Input Vestibule LF1 Operating Signal $O_{rm}$, gates its output $(RM)_i$ to the Query Decoder 39d.

(3) The Query Decoder 39d makes its outputs to the Query Holding System 41 as follows:

(a) Query Decoder Word Output Signals $(MQ)_i$ are sent to the Query Word Register 41a.

(b) Query Decoder Permutation Output Signals (MP) are sent to the Permutation Signal Register 41c.

(c) Query Decoder Null Character Output Signals $(MN)_g$ are sent to the Null Character Register 41b.

(4) Due to the inversion of the *j* indices in the Query Message, Query Data is "backed" into place in the Query Holding System 41 so that the bit designations will match up with the system logic.

(b) The Query Holding System 41 receives Query Message Part One as follows:

(1) The Inputs to the Query Word Register 41a are shifted into place by means of the Query Word Register Shifting Pulse $O_{rq}$.

(2) The inputs to the Null Character Register 41b are shifted into place by the Null Character Register Shifting Pulse $O_{rn}$.

(3) The inputs to the Permutation Signal Register 41c are shifted into place by the Permutation Signal Register Shifting Pulse $O_{rp}$.

(4) Pulses $O_{rq}$, $O_{rn}$, and $O_{rp}$ occur simultaneously. Since there are J shifting steps in each component of the Query Holding System 41, J pulses of each type are required to fully load Query Message Part One.

(5) No shifting pulse occurs in the Interword Logic Register 41d at this time.

(c) The activity in the Input Data Handling System 38 is as described above.

(d) The activity in the Decision System 42 is as described previously above.

(e) The activity in the Output System 43 is as described previously above.

4. LF2 is automatically brought about by the completion of LF1. During LF2 Query Message Part Two is brought from the Query Input System 39 to the Query Holding System 41. The action is as follows:

(a) In the Query Input System 39, the Query Input Buffer 39b, in response to the Query Input Buffer Internal Loading Pulse $O_r$, makes an output $R_i$ to the Query Input Vestibule 39c. The query Input Vestibule 39c, in response to a new operating signal $O_{rf}$, makes its output $(RF)_i$ to the Interword Logic Register 41d. As before, Query Message Part Two is effectively "backed" into place in the Interword Logic Register 41d in order that the logic conforms with designations.

(b) In the Query Holding System 41, no further shift takes place in the Query Word Register 41a, the Null Character Register 41b, or the Permutation Signal Register 41c. In the Interwood Logic Register 41d, however, the Interword Logic Register Shifting Pulse $O_f$ shifts the input from the Query Input Vestibule 39c into place. Since there are exactly K shift steps in the Interword Logic Register 41d, K successive pulses $O_f$ are required to completely load Query Message Part Two.

(c) In the Input Data Handling System 38, the activity is as previously described in paragraph 2 (a) above.

(d) The activity in the Decision System 42 is as previously described above.

(e) The activity in the Output System is as previously described.

(5) Phase change to IBF is brought about automatically by the conclusion of LF2 or manually by the insertion of (RUNB). In this phase the system readies itself for the beginning of a major cycle of search by locating and memorizing the Starting Tag Number of the initial Data Package encountered at the Input Data Entrance Gate 44aa during the course of IBF. The Input Data Handling System 38, the Query Input System 39, the Query Holding System 41, the Decision System 42, and the Output System 43 behave as described above. In the Control System 44 the activity centers in the Input Data Vestibule 44*a*. The Input Data Entrance Gate 44*aa* provides its output $A_i''$ to the Starting Tag Register 44*ac* and to the Tag Comparison Register 44*ad*. The Start Signal Entrance Gate 44*ab* provides its output, the Minor Cycle Start Signal $S_0$, to the Starting Tag Register 44*ac*. When, during IBF, the Minor Cycle Start Signal is a unit, signals $A_i''$ are read into the Starting Tag Register 44*ac*. At this time IBF is ended and OSF begins.

(6) During OSF the actual search operation takes place and the system activity is as follows:

Within the Input Data Handling System 38, the Query Input System 39 and the Query Holding System 41 behave as described previously. In the Decision System 42, the activity is as follows: The Comparison Register 42*a* using inputs $A_{ij}$, $Q_{ij}$, and $N_{gj}$, respectively, from the Input Data Shift Register 38*a*, the Query Word Register 41*a*, and the Null Character Register 41*b*, produces Basic Word Match Signals to the Word Permuting Register 42*b*. The Word Permuting Register 42*b* with the additional inputs $P_j$, the Word Permuting Signals from the Permutation Signal Register 41c, produces Adjusted Word Match Signals $D_j$, which are sent to the Accumulator Register 42*c*. In the Accumulator Register 42*c*, the Adjusted Word Match Signals are accumulated as described in previous sections. The diagonal shift is made in response to the Accumulator Register Operating Pulse $O_e$, in step with the shift of Input Data in the Input Data Shift Register 38*a*. The output of the Accumulator Register 42*c*, Accumulated Word Match Signals $W_j$, occurs at the completion of a minor cycle in response to the signal $O_w$. The Decision Register 42*d*, using the Accumulated Word Match Signals $W_j$, in addition to the Interword Logic Signals $F_{ik}$, from the Interword Logic Register 41*d*, produces Decision Signals Z to the Control System 44. The Output System 43 operates as follows: The Pseudo Output Register 43*d* follows the schematic previously described. The horizontal shift in the Pseudo Output Register 43*b* is accomplished in response to the System Shifting Pulse $O_a$. The Vertical Shift within the Pseudo Output Register 43*b* is made in response to the Decision Signal Z and the Pseudo Output Register Operating Signal $O_h$. The output of the Pseudo Output Register 43*b*, the Pseudo Output Signal $H_R'$, goes to the Output Buffer 43*d*. The Output Buffer 43*d*, on receiving this signal, reads in the contents of the Output Gate 43*c*. At the same time, the existing contents of the Output Buffer 43*d* are shifted one step in the direction of the Output Device 43*e*. In the Control System 44 the activity is as follows: The production of phase, operating, and indication signals continues. In the Input Data Vestibule 44*a*, the inputs $A_i''$, from the Input Data Entrance Gate 44*aa*, and $(AQ)_i$, from the Starting Tag Register 44*ac*, are compared in the Tag Comparison Register 44*ad*. When a match occurs, the Major Cycle Completion Signal (TM) is sent to the Control Unit 44*c*. This subsequently terminates OSF and causes ISF to be resumed. The insertion manually of (STOB)' may likewise terminate OSF and cause the resumption of ISF. With the recurrence of ISF, the Desired Data stored in the Output Buffer 43*d* may be unloaded to the Output Device 43*e* if the signal (PRIN) is received from the Control Unit 44*c*. The signal (PRIN) may occur only during ISF.

*Operational summary-comparator unit*

Previously the internal operation of the Comparator Unit 33 was reviewed by describing the activity in each of the six basic systems through normal operating cycles. Following is a summary of the operation of the Comparator Unit as seen at the Operator's Console. It will be assumed in the discussion that the Central Data Store described above is in operation, and that the initial phase of the Comparator Unit is OFF. FIGS. 7 and 8 illustrate the system phases and the comparator flow chart. Starting in the OFF phase, the Comparator Unit Operator readies the system for operation as follows:

Places Power Switch in "ON" position.

Places Operation Selector in "Initiate."

Depresses Operation Selector Insert Button.

The above procedure places the system in ISF. This is indicated by the Comparator Idling Light. The Comparator Unit is now "ready for business." Operators at remote user stations compose file interrogations in the form of Query Messages, determine Data Store(s) to be interrogated, and determine the destination (after search) of the output. These decisions are entered into the system via the Query Input Device at that station and are indicated to the Comparator Unit Operator as follows:

Source Requiring Service Light comes "on";

Desired Data Store(s) to be Interrogated Light comes "on";

Desired Destination of Output Light comes "on."

When these conditions prevail, the Comparator Unit Operator loads the Comparator Unit from the remote user station Query Input Device as follows:

(a) Places Query Source Selector Switch in position to match the Source Requiring Service Light.

(b) Depresses Query Source Selector Insert Button.

This procedure causes the Query Message to be brought into the Query Input Buffer and the action is indicated by the Input/Output Status and immediately following this, the Query Input Buffer Loading Light comes "on." When the Query Input Buffer 39*b* is completely loaded, the Query Input Buffer Loading Light goes "off," and the Query Input Buffer Loaded Light comes "on." When this is attained, the Comparator Unit Operator places the Input Data Selector Switch in a position to *match* the Data Store to be Interrogated Light. The Counter Reset Button (a manual mechanical reset) is depressed (to remove any residual count).

*Search operations*

As a result of External Loading and Search Preparation, the Comparator Unit is ready to commence a search. The Operator therefore (a) Places the Operation Selector Switch in the START position.

(b) Depresses the Operation Selector Insert Button.

As a result of this, the Comparator Unit commences a Complete Cycle. The following indications appear on the Operator's Console:

(a) The Comparator Idling Light goes "off" immediately.

(b) The Operating Cycle-In-Progress Light comes "on."

(c) The Decision Counter commences to indicate the number of Desired Data Packages encountered.

(d) On completion of a Complete Cycle (unless sooner terminated), the Operating Cycle-in-Progress Light goes "off" and the Operating Cycle-Completed Light comes "on." In addition, the Comparator Idling Light comes "on."

*Output operations*

As a result of the search operations, the Comparator Unit is ready to make an output (if desired). Assuming this to be the case, the Comparator Unit Operator then, (a) Places the Output Destination Selector in position to *match* the Destination of Output Light (corresponding to the Source Requiring Services Light).

(b) Depresses the Output Destination Selector Insert Button.

In response to the above, an output from the Output Baffer 43*d* commences and the following indications appear:

(a) The Output Buffer Unloading Light immediately comes "on."

(b) When the Output Buffer 43*d* has unloaded to the Output Device 43*e* (at the remote user station) the Output Buffer Unloaded Light comes "on" and the Output Buffer Unloading Light goes "off."

*Search without reload*

Assuming that another Data Store is to be interrogated against the same Query Message existing in the Comparator Unit from the preceding search, the Comparator Unit Operator, (a) Places the Input Data Store Selector in position to *match* the new Data Store to be Interrogated Light.

(b) Places the Operation Selector Switch in the RUN position.

(c) Depresses (optional) the Counter Reset Button.

(d) Depresses the Operation Selector Insert Button.

The response to the above is the commencing of an Abbreviated Cycle. This is indicated as follows:

(a) The Comparator Idling Light goes "off."

(b) The Operating Cycle Completed Light comes "on."

(c) On completion of the Abbreviated Cycle the Operating Cycle-In-Progress Light goes "off" and the Operating Cycle Completed Light comes "on." The Comparator Idling Light also comes "on."

(d) As before, the Decision Counter indicates the number of Desired Data Packages encountered.

*Reloading*

The Comparator Unit may be reloaded at any time except during LF1 and LF2 by repeating the procedure of external loading mentioned above. (There is no indication of phases LF1 and LF2; if reloading is attempted during LF1 or LF2, the Query Input Buffer Loading Light will simply not come on and the system will not load.)

While only one representative embodiment of the invention disclosed herein has been outlined in detail, there will be obvious to those skilled in the art, many modifications and variations accomplishing the foregoing objects and realizing many or all of the advantages, but which do not depart essentially from the spirit of the invention.

What is claimed is:

1. An information retrieval system comprising:

data storage means;

input means coupled to said data storage means fo inserting data into said data storage means;

reading means coupled to said data storage means fo sequentially and continually reading out the data ir said data storage means;

a plurality of comparator means coupled to said reading means, each of said comparator means functioning simultaneously with and independently of the other of said comparator means, and including a plurality of registers connected to extract desired data from said reading means in accordance with received queries which define desired data in terms of characteristics, combinations of characteristics or permutations of characteristics, and a plurality of user stations, each station controllably coupled to one of said plurality of comparator means and functioning to furnish said queries to said comparator means and to receive said extracted desired data from said comparator means.

2. An information retrieval system as set forth in claim 1 wherein said data storage means is divided into three storage devices, the first of which contains a small amount of data that desirably can be retrieved in a short time, the second of which contains a larger amount of data that desirably can be retrieved in a longer time and the third of which contains all of the stored data.

References Cited

UNITED STATES PATENTS

| | | | |
|---|---|---|---|
| 2,967,296 | 1/1961 | Chien et al. | 340—172. |
| 2,996,699 | 8/1961 | Kramskoy | 340—172. |
| 3,030,609 | 4/1962 | Albrecht | 340—172. |
| 3,107,343 | 10/1963 | Poole | 340—172. |
| 3,181,123 | 4/1965 | Wright et al. | 340—172. |
| 3,195,109 | 7/1965 | Behnke | 340—172. |
| 3,197,742 | 7/1965 | Rettig et al. | 340—172. |
| 3,221,308 | 11/1965 | Petersen et al. | 340—172. |
| 3,229,255 | 1/1966 | Anderson | 340—172. |
| 3,261,000 | 7/1966 | Behnke | 340—172. |

PAUL J. HENON, *Primary Examiner.*

ROBERT C. BAILEY, *Examiner.*